ELECTRO-OPTICAL CIRCUITRY HAVING IMPROVED RESPONSE SPEED

Filed March 30, 1961 2 Sheets-Sheet 1

INVENTORS
THOMAS G. DUNNE
JOHN HEER
SOL TRIEBWASSER
BY Elmer Galbiati
AGENT

United States Patent Office 3,145,302

Patented Aug. 18, 1964

3,145,302

ELECTRO-OPTICAL CIRCUITRY HAVING IMPROVED RESPONSE SPEED

Thomas G. Dunne, Yorktown Heights, John Heer, White Plains, and Sol Triebwasser, Peekskill, N.Y., assignors to International Business Machines Corporation, New York, N.Y., a corporation of New York Filed Mar. 30, 1961, Ser. No. 99,401
5 Claims. (Cl. 250—213)

This invention relates to electro-optical devices and more particularly to means for increasing the speed of such devices.

Electro-optical logical circuitry generally consists of stages, each of which has one or more light receiving inputs and one or more light producing outputs. The particular output (or outputs) which is active at any one time is determined by which of the inputs is active. Such circuitry is well known, for example, application Serial No. 3,861 entitled "Photo-Responsive Logical Circuits," filed January 21, 1960, by Paul R. Lowe and Rex Rice, shows a plurality of different electro-optical circuits.

Each stage is an electro-optical circuit generally consists of a power source, a current limiting resistor connected in series with the power source, a light producing device, and one or more light responsive devices either connected in series or in parallel with the light producing device.

The light responsive devices receive light signals and in response to these signals their resistance changes thereby changing the voltage applied to the light producing devices. This change in voltage ignites or extinguishes the light producing devices depending on the direction of the change. The current limiting resistors are needed because the resistance of the light producing devices generally used in these circuits is negligible when such devices are active, and hence without a current limiting resistor there would be a virtual short circuit across the power supply when the light producing device was active.

One of the disadvantages inherent in the electro-optical circuitry shown in the prior art is that the circuitry has a relatively slow switching time compared to other devices presently in use. The switching time of each stage is limited by (*a*) the nature of the light detecting device; (*b*) the nature of the light producing device, and (*c*) the nature of the electrical circuitry between the light detecting device and the light producing device.

The present invention increases the speed of electro-optical logical circuitry by improving item "*c*" above, i.e., improving the nature of the electrical circuitry between the light detecting device and the light producing device.

An object of the present invention is to provide improved electro-optical circuitry.

A further object of the present invention is to provide faster electro-optical circuitry.

Still another object is to decrease the turn on time of electro-optical circuitry.

Yet another object is to decrease the turn off time of electro-optical circuitry.

Another object is to provide a circuit which achieves the above objects without decreasing the useful life of the light producing devices in the circuit.

Another object of the present invention is to improve the switching time of photo-responsive logical circuitry.

Another object of the present invention is to decrease the switching time of photo-logical circuitry without shortening the life time of the light producing devices in such circuitry.

A still further object of the present invention is to improve the characteristics of the electrical circuit which connects the light detecting devices to the light producing devices in an electro-optical circuitry.

The response time of light producing devices is decreased by applying larger voltages to the devices. However, the current through light producing devices is a function of the voltage applied to the devices and increased currents through light producing devices reduce the life expectancy of such devices. The present invention improves (i.e., reduces) the response time of each stage of electro-optical circuitry without substantially decreasing the useful life of the light producing devices in the circuit by placing a capacitor in parallel with the current limiting resistor in each stage of the circuitry.

The capacitor in effect eliminates the current limiting resistor from the circuit during the period while the circuit is turning on (i.e., while the current in the circuit is increasing). The result is that (1) a larger voltage is more quickly applied to the light producing device, (2) a slight transient overshoot is produced in the current through the light producing device and in the magnitude of the light output from the light producing device, and (3) the overshoot in the intensity of the light output from the light producing device decreases the response time of the light detecting device in the next stage of the circuit.

The speed of the overall circuit is increased for two separate reasons (1) because the light producing device turns on more quickly and (2) because the light detecting devices respond more quickly.

The time duration in the transient overshoot in the magnitude of the current through the light producing device and hence the time duration of the transient overshoot in the intensity of the light output from the light producing device is directly dependent upon the size of the capacitor placed in parallel with the current limiting resistor. The size of this capacitor should be so chosen that the duration of the transient overshoot is just slightly longer than the time it takes for the light detecting device in the next stage to respond. In this manner increased speed of response is achieved without maintaining an unduly large current through the light producing device for any longer than is useful.

The high intensity light during the transient period quickly turns on the next stage of the electro-optical circuitry. However as soon as the next stage has been turned on the circuit returns to a state where the current through the light producing device is not unduly large. Hence, the speed of the circuitry is increased without substantially decreasing the useful life of the light producing devices.

Another advantage of the present invention is that the capacitor in parallel with the current limiting resistor also decreases the turn off time of each stage of the electro-optical circuitry.

The foregoing and other objects, features and advantages of the invention will be apparent from the following more particular description of preferred embodiments of the invention as illustrated in the accompanying drawings.

Figure 1:
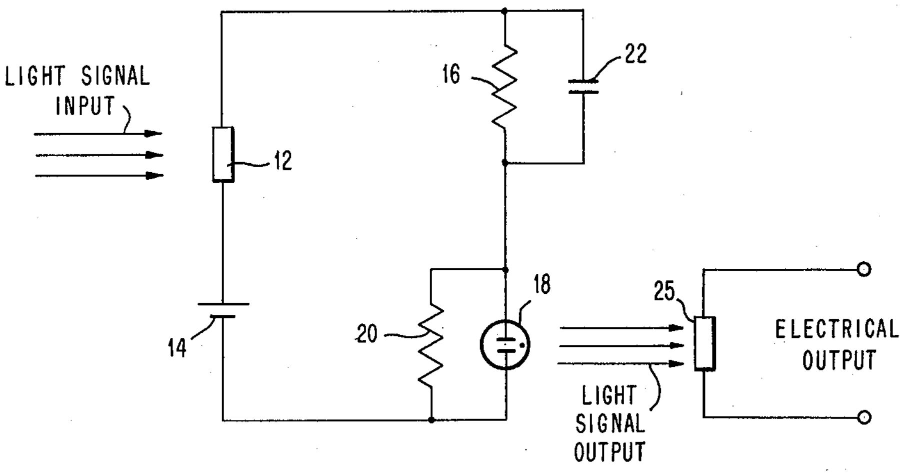
FIGURE 1 shows a simplified electro-optical circuit.

FIGURES 4*a*, 4*b*, 4*c* and 4*d* are timing diagrams which show various wave shapes in relation to time for the circuit shown in FIGURE 1.

The principle of the invention will first be described with reference to the simple electro-optic device shown in FIGURE 1. Photoconductor 12 is serially connected with power supply 14, current limiting resistor 16, and neon bulb 18. Stabilizing resistor 20 is connected across the neon bulb 18 and a capacitor 22 is connected across the current limiting resistor 16. The device receives a light signal input at photoconductor 12 and in response thereto produces a light signal output from neon bulb 18.

Figure 3:
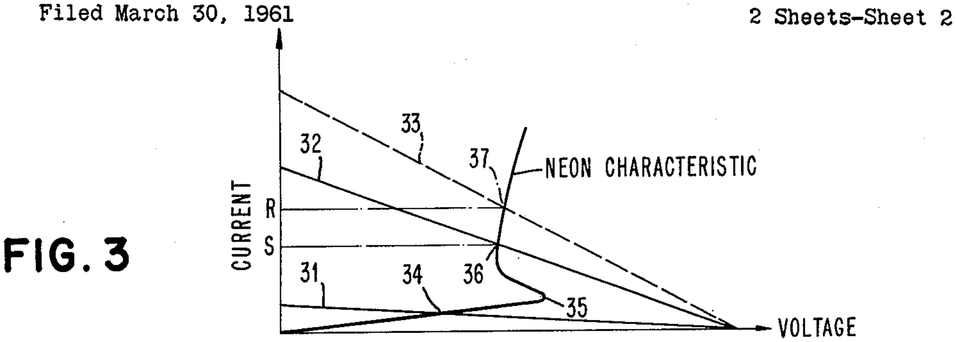
FIGURE 3 is a graph showing the voltage-current characteristics of a light producing device and showing load lines under various conditions for the circuit shown in FIGURE 1.

The photoconductor 12 is a resistor the magnitude of the resistance of which varies depending upon the amount of light incident thereon. When illuminated the photoconductor 12 has a low resistance (hereinafter called its "illuminated" resistance) and when not illuminated, the photoconductor 12 has a high resistance (hereinafter called its "dark" resistance). The neon bulb 18 can be ignited by applying a certain critical voltage across its terminals. The voltage current characteristics of the neon 18 are shown in FIGURE 3. When a light signal is applied to the photoconductor 12, it assumes a low (illuminated) resistance state and a substantial portion of the power supply voltage appears across neon 18. The critical voltage of the neon is thereby exceeded and it ignites producing an output light signal.

The magnitude of the resistors 16, 20, and 12 is so chosen that the dark resistance of the photoconductor 12 is high compared to the sum of the magnitudes of resistors 16 and 20, hence when the photoconductor 12 is not illuminated insufficient voltage appears across the terminals of the neon 18 to ignite it. However, these magnitudes must also be chosen so that when the photoconductor 12 is in the low resistance state, sufficient voltage does appear across the terminals of neon 18 to exceed its critical voltage and ignite it.

The stabilizing resistor 20 prevents oscillations in the circuit by allowing a small amount of current to flow through the photoconductor 12 even when the neon 18 is in the nonconducting state (i.e., when the neon 18 is not activated). The small amount of current flowing through the photoconductor 12 when it is in its high resistance state (i.e., dark) produces a substantial voltage drop across the photoconductor 12 and there is not sufficient voltage across neon 18 to ignite it. If no resistor 20 were present in the circuit, the circuit would tend to oscillate since after the neon stops conducting there would be no current in the circuit and hence, there would be no voltage drop across photoconductor 12 or across current limiting resistor 16. All of the potential of the voltage supply would thus appear across in neon 18 tending to re-ignite it. When the neon did re-ignite allowing current to flow in the circuit, the voltage across the neon would decrease below its critical value, and it would be extinguished. The result would be an oscillatory "on-off" condition.

Current limiting resistor 16 is necessary since the neon 18 has a very low apparent resistance when ignited and hence without current limiting resistor 16 currents in the circuits would be excessive when the photoconductor 12 is in the low resistance state.

The time lapse between the application of a voltage to the neon bulb 18 and the ignition of the neon bulb is a function of the magnitude of the voltage applied. Hence, the response time of the circuit can be shortened by increasing the magnitude of the power supply 14 and adjusting the various resistors so that a larger voltage appears across the neon when the photoconductor 12 is placed in the low resistance state by a light signal.

The length of the useful life time of the neon 18 is also a function of the magnitude of the voltage applied to the neon, i.e., the length of the useful life of a neon is shortened by the application of larger voltages to the neon. Furthermore, other disadvantages such as excessive heat dissipation, large power requirements etc. are also incurred by increasing the magnitude of the voltage applied to the neon in order to decrease its response time. Hence, the disadvantage of increasing the magnitude of power supply 14 to decrease the response time outweigh the advantages.

The purpose of capacitor 22 which is placed in shunt with current limiting resistor 16 is to increase the speed of response of the circuit without incurring the disadvantages inherent in increasing the magnitude of the voltage applied to the neon. The function and operation of capacitor 22 will be described with reference to FIGURES 3 and 4.

FIGURE 3 shows the voltage-current characteristics of the neon bulb and it also shows three load lines for the circuit shown in FIGURE 1. Each load line represents a different condition in the circuit.

(*a*) Load line 31: the load line of the circuit under static conditions when the photoconductor 12 is not illuminated and neon 18 is not ignited.

(*b*) Load line 32: the load line of the circuit in the steady state condition with photoconductor 12 illuminated and neon 18 is ignited.

(*c*) Load line 33: the load line of the circuit after ignition of the neon 18 and under the assumption that resistor 16 is shorted out.

In the steady state when the photoconductor 12 is not illuminated the circuit operates at point 34 in FIGURE 3, i.e. the intersection of load line 31 and the neon characteristic. In the steady state with the photoconductor 12 illuminated the circuit opeartes at point 36 in FIGURE 3, i.e., the intersection of load line 32 and the neon characteristic.

The application of a light signal to photoconductor 12 reduces its resistance and changes the load line for the circuit. The load line becomes more vertical as the resistance of the photoconductor 12 is decreased. The operating point of the circuit moves along the neon characteristic as the load line changes. After the resistance of the photoconductor 12 has decreased sufficiently that the operating point has passed the point on the neon characteristic designated as point 35 the neon begins to ignite.

Capacitor 22 decreases the response time of the neon (i.e., decreases the time between the application of a signal to photoconductor 12 and the ignition of neon 18) in two ways. First, since the voltage across the capacitor requires a finite time in which to change there is less of a voltage drop across the parallel combination of resistor 16 and capacitor 22 (while the circuit is changing conditions) than there would be if capacitor 22 were not in the circuit. Hence, there is a greater voltage drop across the neon 18 during each instant of the transient period and the circuit arrives at operating point 35 more quickly. Second, the physics of neon bulbs is such that the time delay between the application of sufficient voltage to the neon and ignition is a function of the magnitude of the voltage applied to the neon during the ignition period. Furthermore, during the ignition period the current in the circuit is increasing. Capacitor 22 prevents the increased current from causing an increased voltage across resistor 16 (more precisely it delays the increase in voltage) hence, there is a greater voltage drop across neon 18 and it ignites more quickly.

Stated differently, the above two effects may be described as follows. Capacitor 22 decreases the rate of change of voltage across the parallel circuit formed by resistor 16 and capacitor 22. Hence, when the circuit is changing state (i.e., when it is in a transient condition) the voltage distribution in the circuit is to a large degree controlled by capacitor 22. (This is assuming that the time constant of the circuit is substantially longer than the time required for resistor 12 to change states.) The capacitor reduces the rate of change of the voltage across its terminal thereby increasing the rate of change of the voltage across the neon and the circuit reaches point 35 on the neon characteristic (its critical or ignition voltage) more quickly. Second, during the ignition period (as the neon goes past point 35 on its characteristic) the capacitor prevents the voltage across the resistor-capacitor circuit from increasing rapidly, hence it prevents the voltage across the neon from decreasing rapidly, as would be required if the neon current were forced to go through resistor 16. The result is quicker ignition.

Figures 4A, 4B, 4C, 4D:
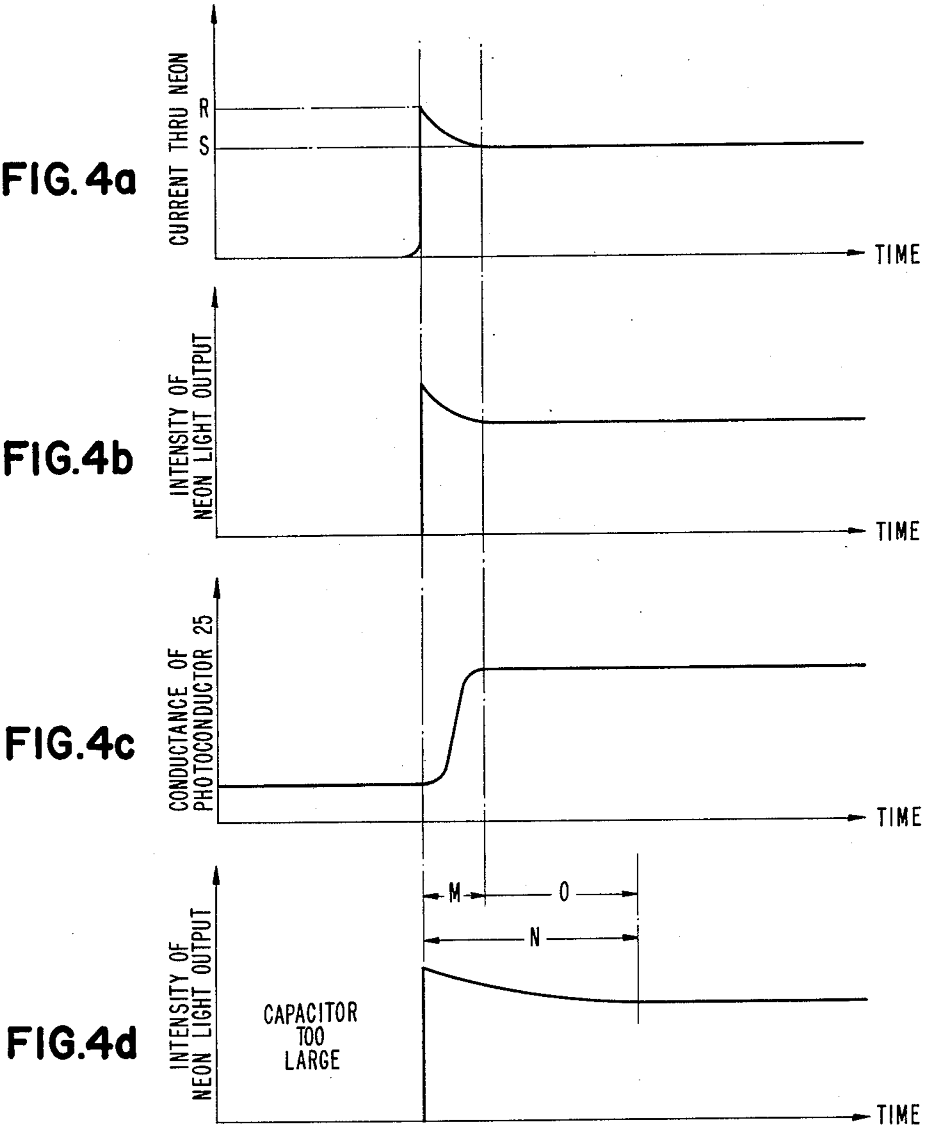

Capacitor 22 also has the effect of producing a transient overshoot at the leading edge of the current through the neon. This is illustrated in FIGURE 4*a*. The reason for this transient overshoot can be seen by examining load lines 32 and 33 in FIGURE 3. Immediately following the ignition of neon 18 the circuit operates at a point designated by the intersection of load line 33 and the neon characteristic. The reason for this is that the capacitor 22 requires a finite amount of time to charge and it thereby, in effect, shorts out resistor 16 during transient periods (while the circuit is changing state). Hence, during transient periods the circuit operates along a load line established under the assumption that resistor 16 is not in the circuit. After ignition, capacitor 22 charges (relatively slowly) and the operating point of the circuit moves from point 37 to point 36 on the characteristic thereby decreasing the current through the circuit. The initial amount of current through the circuit is that designated by the letter R in FIGURE 3, however, after the circuit finally reaches the steady state condition, the magnitude of the current reduces to that designated by the letter S in FIGURES 3 and 4.

The intensity of light output from neon 18 is directly proportional to the magnitude of the current through the neon 18. Hence, with respect to the intensity of the output light signal, there is a transient overshoot at the leading edge of the signal. This is illustrated in FIGURE 4*b*.

The duraiton of the transient overshoot is controlled by the magnitude of capacitor 22. If capacitor 22 is large it requires a longer time to charge and hence the transient overshoot will last for a longer period of time.

The light signal output from the circuit shown in FIGURE 1 is converted to an electrical output by the use of a second photoconductor, i.e., photoconductor 25. The electrical output is manifested as a change in the resistance of this photoconductor as the light signal output is incident on photoconductor 25.

The physics of photoconductors is such that the amount of time required to change their resistance characteristics after a light signal is incident thereon is dependent upon the intensity of the incident light signal. A light signal with a greater intensity changes the characteristics of a photoconductor more quickly.

The increased intensity of the light signal output of neon 18 during the transient overshoot period can be uitilized to quickly change the characteristics of the output photoconductor 25 without increasing the intensity of the light output during steady state operation. It is preferable to choose the magnitude of capacitor 22 so that the transient overshoot in the intensity of the light output has sufficient duration to effect a change quickly in the resistance characteristic of photoconductor 25. However, it is also preferable to choose the magnitude of capacitor 22 so that the duration of the increased intensity light from neon 18 is not longer than time required for the photoconductor 25 to change from a high to a low resistance state.

The life expectancy of neons is directly related to the magnitude of current through the neons and the intensity of the light output from neon is directly related to the magnitude of the current through the neons. Therefore, by having the high intensity light signal output from the neon last only during a short transient period (1) the photoconductor upon which the light signal acts is quickly switched from a high resistance to a low resistance state, and (2) the life expectancy of the neon is not shortened by having a large current through the neon.

The effect of an unduly large capacitor is illustrated in FIGURE 4*d*. The large capacitor causes a transient overshoot at the leading edge of the light signal output to last for a long period of time. In FIGURE 4*d* the period is designated by the letter N. Since the photoconductor on which the light signal operates has completed its transition during the period of time designated by the letter M in FIGURE 4*c*, the increased intensity of the light signal during the period of time designated by the letter O merely has the detrimental effect of decreasing the life expectancy of the neon without producing any beneficial effect in the circuit.

A small capacitor which did not produce a transient overshoot of sufficient duration to substantially decrease the response of resistor 25 would still be useful to decrease the amount of time required to ignite the neon 18.

The capacitor 22 has the further effect of decreasing the amount of time required to extinguish neon 18 after the light signal input to photoconductor 12 is terminated. Termination of the light signal input to photoconductor 12 increases the resistance of photoconductor 12 and this increase in resistance in the circuit decreases the current flow through the circuit. Without capacitor 22, the decrease in current flow through the circuit would cause a concomitant decrease in the voltage across resistor 16. However, with capacitor 22 shunting resistor 16 the voltage across resistor 16 cannot change instantaneously. As the current in the circuit decreases the voltage drop across current limiting resistor 16 cannot decrease as quickly as it would without capacitor 22 in the circuit and hence it absorbs a larger portion of the voltage supply leaving less voltage across the neon 18. This decrease in voltage across neon 18 serves to more quickly extinguish the neon.

In conclusion it can be seen that the capacitor 22 has three separate actions in the circuit. First, it decreases the time required to ignite the neon 18 after a signal is applied to the photoconductor 12, second, it produces a transient overshoot in the light signal output from the neon 18, thereby decreasing the response time of the photoconductor upon which the light signal operates, and third, the capacitor 22 increases the speed with which neon 18 is extinguished after a light signal is removed from the photoconductor 12.

Figure 2:
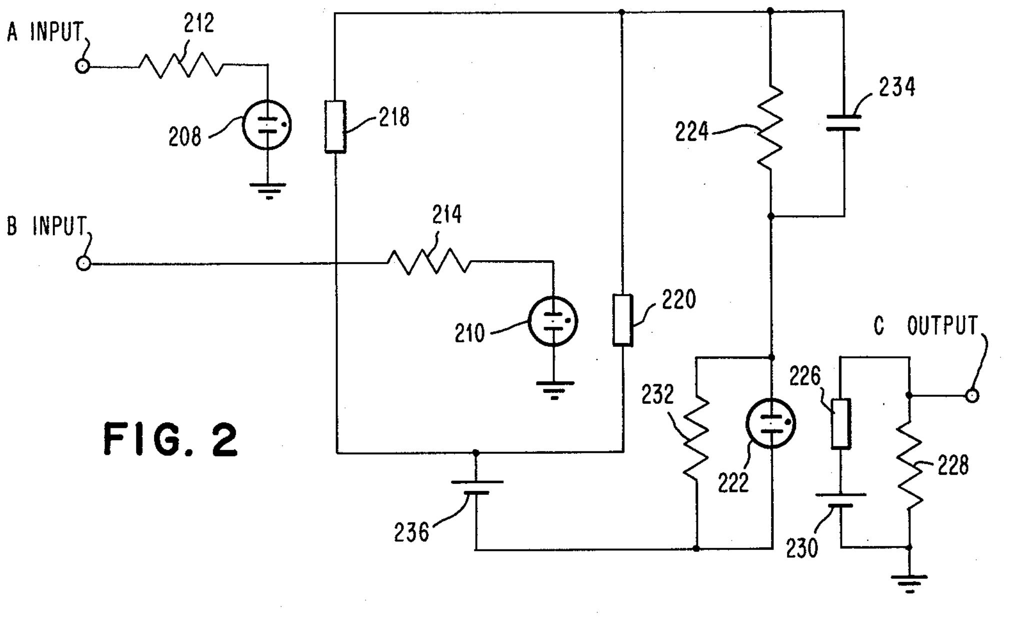
FIGURE 2 shows a photological OR circuit built in accordance with the teaching of the present invention.

A second example of a *photological circuit* which utilizes the principle of this invention is illustrated in FIGURE 2, which shows a photological OR circuit built in conformity with the present invention. The circuit shown in FIGURE 2 has two inputs, A and B, and an output C. If a voltage is applied to either input A or B, a voltage appears at output C. However, if there is no voltage at either input A or B no voltage will appear at output C.

The circuit consists of two input light sources 208 and 210 which are respectively activated by inputs A and B. Light sources 208 and 210 have associated therewith current limiting resistors 212 and 214 respectively connected in series with the associated light source to limit the amount of current through the light sources when signals are applied to the input terminals.

The light from the light sources 208 and 210 respectively illuminate photoconductors 218 and 220. Photoconductors 218 and 220 are connected in a parallel circuit which in turn is connected in series with the output light producing device 220 and the current limiting resistor 224. Light from light source 222 falls on photoconductor 226 which is in series with the load resistor 228 and the power supply 230. An output appears at terminal C whenever photoconductor 226 is in a low resistance state due to illumination from light source 222. The circuit has a stabilizing resistor 232 connected in shunt with the light source 222 in order to stabilize the circuit. (The effect of resistor 232 is the same as that of resistor 20 in the first embodiment.)

The circuit also has a capacitor 234 in shunt with current limiting resistor 224 to increase the speed of the circuit as did capacitor 22 in the first embodiment. Capacitor 234 (1) decreases the time delay between the application of an input voltage to either input A or input B and the ignition of neon 222 (2) produces an overshoot at the leading edge of the current through neon 222 and in the intensity of the light output from neon 222 thereby increasing the speed of response of photoconductor 226 (3) decreases the amount of time delay between the removal of an input and the extinguishment of neon 222. The operation of capacitor 234 to produce the above three functions is the same as that of capacitor 22 of the first embodiment and hence no further explanation will be given. In this embodiment as in the first embodiment the magnitude of capacitor 234 is preferably chosen so that the capacitor is effective to increase the speed of the circuit without substantially decreasing the useful life of neon 222.

As an example of the operation of the circuit shown in FIGURE 2, an input signal applied to terminal A ignites light producing device 208, thereby causing the photoconductor 218 to assume a low resistance state. With the photoconductor 218 in the low resistance state, sufficient voltage is applied across neon 222 to ignite the same, thereby illuminating photoconductor 226 and causing an increased current to flow from power source 230 through resistor 228. The current through resistor 228 produces an output signal at terminal C.

The OR circuit shown in FIGURE 2 is merely meant to be an illustrative example of the type of photological circuits that can be developed embodying the principle of the present invention. Various other logical functions could be developed utilizing the same principle, hence the invention is not limited to the logical OR function shown.

The input shown in the circuit of FIGURE 2 could be the output light producing device of other logical devices constructed in accordance with the present invention. Naturally where a series of devices are used the output of one device being utilized as the input to the next device, the total decrease in response time of the circuit would be the sum of the decreases in response times of the individual circuits.

The present invention can be utilized to increase the speed of any switching circuit which includes a light producing device in series with a current limiting resistor. The invention is not limited to circuits wherein the light responsive device is a photoconductor.

While the invention has been particularly shown and described with reference to two embodiments thereof, it will be understood by those skilled in the art that the foregoing and other changes in form and details may be made therein without departing from the spirit and scope of the invention.

What is claimed is:

1. An electro-optic gate circuit comprising in combination
   a voltage supply, a first light responsive resistor, a current limting resistor, and a light producing means connected in series;
   said first light responsive resistor having a high resistance when dark and a low resistance when illuminated, said light producing means adapted to be activated by a critical voltage;
   a second light responsive resistor positioned to receive light from said light producing means, said second light responsive resistor requiring a certain period of time $(x)$ after being illuminated to change state;
   means for illuminating said first light responsive resistor to cause it to assume its low resistance state, thereby activating said light producing means;
   a capacitor shunting said current limiting resistor, whereby the voltage applied to said light producing means is increased during periods when said first light responsive resistor is changing from high to low resistance;
   and whereby the intensity of the initial light output is greater than the steady state light output;
   the magnitude of said shunting capacitor being such that the light intensity reaches its steady state value in a time period substantially equal to the time period $(x)$.

2. An electro-optic circuit comprising in combination
   a voltage supply, a current limiting resistor and a light producing means connected in a series circuit,
   said light producing means being activated by a critical voltage,
   a light responsive resistor having a low resistance when illuminated and a high resistance when dark;
   means connecting said light responsive resistor to said light producing means whereby the voltage across said light producing means is affected by said light responsive resistor;
   a resistor connected in shunt across said light producing means the magnitude of said resistors being such that the voltage across said light producing means exceeds said critical voltage only when said light responsive resistor is illuminated; and
   means for illuminating said light responsive resistor;
   a capacitor connected in shunt with said current limiting resistor,
   whereby an increased portion of the source voltage appears across said light producing means as said resistance changes from a high to a low resistance,
   and whereby the intensity of the initial light output is greater than the steady state light output.

3. An electro-optic gate circuit comprising in combination
   a voltage supply, a first light responsive resistor, a current limiting resistor, and a light producing means connected in series,
   said first light responsive resistor having a high resistance when dark and a low resistance when illuminated, said light producing means adapted to be activated by a critical voltage;
   a second light responsive resistor positioned to receive light from said light producing means, said second light responsive resistor requiring a certain period of time $(x)$ after being illuminated to change state;
   means for illuminating said first light responsive resistor to cause it to assume its low resistance state, thereby activating said light producing means;
   a stabilizing resistor connected across said light producing means to prevent oscillations;
   a capacitor shunting said current limiting resistor, whereby the voltage applied to said light producing means is increased during periods when the current in said circuit is increasing,
   and whereby the intensity of the initial light output is greater than the steady state light output,
   the magnitude of said shunting capacitor being such that the light intensity reaches its steady state value in a time period substantially equal to the time period $(x)$.

4. An electro-optic OR circuit comprising in combination
   a plurality of input means for generating light input signals;
   a first circuit means comprising a plurality of parallel paths, one path for each input means, each of said paths including a light responsive resistor having a low resistance when illuminated and a high resistance when dark, said light responsive resistors positioned to receive light from the associated input means; said light responsive resistors requiring a certain period of time to change state;
   a voltage supply, a current limiting resistor, and a light producing means connected in series with said first circuit means;
   said light producing means adapted to be activated by a critical voltage, the magnitude of said power supply and of said resistors being such that the voltage applied to said light producing means is increased to said critical voltage whenever one of said light responsive resistors is in its low resistance state; and
   a capacitor shunting said current limiting resistor,
   whereby the intensity of the initial light output is greater than the steady state light output,
   the magnitude of said shunting capacitor being such that the light intensity reaches its steady state value in a time period substantially equal to the time period required for said light responsive resistor to change state.

5. An electro-optic OR circuit comprising in combination a plurality of input means for generating light input signals;

a first circuit means comprising a plurality of parallel paths, one for each input means, each of said paths including a light responsive resistor having a low resistance when illuminated and a high resistance when dark, said light responsive resistors positioned to receive light from the associated input means; said resistor requiring a period of time ($x$) to change state;

a voltage supply, a current limiting resistor, and a light producing means connected in series with said first circuit means;

said light producing means adapted to be activated by a critical voltage, the magnitude of said power supply and of said resistors being such that the voltage applied to said light producing means is increased to said critical voltage whenever one of said light responsive resistors is in its low resistance state;

a stabilizing resistor connected across said light producing means to prevent oscillations; and a capacitor shunting said current limiting resistor, whereby the intensity of the initial light output is greater than the steady state light output, the magnitude of said shunting capacitor being such that the light intensity reaches its steady state value in a time period substantially equal to the time period ($x$).

References Cited in the file of this patent

UNITED STATES PATENTS

| | | |
|---|---|---|
| 1,988,274 | Glaser | Jan. 15, 1935 |
| 2,040,439 | Langer | May 12, 1936 |
| 2,353,218 | Burnham et al. | July 11, 1944 |
| 2,408,589 | Wells | Oct. 1, 1946 |
| 2,717,336 | Craddock | Sept. 6, 1955 |
| 3,034,011 | Nisbet et al. | May 8, 1962 |
| 3,040,178 | Lyman et al. | June 19, 1962 |
| 3,062,961 | Kalns et al. | Nov. 6, 1962 |

OTHER REFERENCES

Dersch: EL-PC Shift Register, IBM Technical Disclosure Bulletin, vol. 3, No. 3, August 1960, page 69.